United States Patent Office.

CATHERINE E. HOWARD, OF SAN GABRIEL, CALIFORNIA.

Letters Patent No. 100,293, dated March 1, 1870.

IMPROVEMENT IN THE MANUFACTURE OF ARTIFICIAL FLOWERS.

The Schedule referred to in these Letters Patent and making part of the same.

*To all whom it may concern:*

Be it known that I, CATHERINE E. HOWARD, of San Gabriel, in the county of Los Angeles, and State of California, have invented a new and useful Mode of Making Artificial Flowers; and I do hereby declare that the following is a full, clear, and exact description of the same.

This invention consists in the formation of artificial flowers out of the cocoon of the silk-worm.

The cocoons, in their crude, unwound state, are, in the first place, cut transversely, and, when this is done, the section presents the edges of many concentric layers. The operator separates these layers, strips off as many as he desires, and, with an instrument, cuts them into the shape of flower petals of any variety he pleases, flattening the layers down, so as to represent spreading petals, or keeping them standing, for the purpose of forming bell-shaped or tube-shaped flowers. These may be colored, if desired, and, in the hands of a competent artist, may be wrought into very beautiful productions.

Having thus described my invention,

What I claim as new, and desire to secure by Letters Patent, is—

Artificial flowers, when made, as described, from crude cocoon of the silk-worm.

C. E. HOWARD.

Witnesses:
F. H. HOWARD,
A. J. HOWARD.